US008023533B2

(12) United States Patent
Kure

(10) Patent No.: US 8,023,533 B2
(45) Date of Patent: Sep. 20, 2011

(54) DATA COMMUNICATION SYSTEM, DATA TRANSMITTING APPARATUS, DATA TRANSMITTING METHOD, AND METHOD FOR DETERMINING PACKET SIZE AND REDUNDANCY

(75) Inventor: Yoshinobu Kure, Kanagawa (JP)

(73) Assignee: Sony Corporation, Tokyo (JP)

( * ) Notice: Subject to any disclaimer, the term of this patent is extended or adjusted under 35 U.S.C. 154(b) by 780 days.

(21) Appl. No.: 11/958,643

(22) Filed: Dec. 18, 2007

(65) Prior Publication Data

US 2008/0151776 A1 Jun. 26, 2008

(30) Foreign Application Priority Data

Dec. 25, 2006 (JP) ................ P2006-346959

(51) Int. Cl.
*H04J 3/06* (2006.01)
*H03M 13/00* (2006.01)
(52) U.S. Cl. ............... 370/503; 370/516; 714/776
(58) Field of Classification Search ............... None
See application file for complete search history.

(56) References Cited

U.S. PATENT DOCUMENTS

| | | | | |
|---|---|---|---|---|
| 6,898,758 | B2 * | 5/2005 | Krishnamachari | 714/799 |
| 7,304,959 | B1 * | 12/2007 | Swaroop et al. | 370/252 |
| 2004/0146299 | A1 * | 7/2004 | Clapp | 398/49 |
| 2005/0013249 | A1 * | 1/2005 | Kong et al. | 370/235 |
| 2005/0154965 | A1 * | 7/2005 | Ichiki et al. | 714/776 |
| 2006/0075321 | A1 * | 4/2006 | Vedantham et al. | 714/776 |
| 2008/0295098 | A1 * | 11/2008 | Cardona et al. | 718/101 |

FOREIGN PATENT DOCUMENTS

| | | |
|---|---|---|
| JP | 2001-086153 | 3/2001 |
| JP | 2004-215224 | 7/2004 |
| JP | 2005-136548 | 5/2005 |
| JP | 2005-175837 | 6/2005 |
| JP | 2007-028051 | 2/2007 |

OTHER PUBLICATIONS

Adaptive hybrid ARQ in wireless ATM networks Jianfeng Pu; Yilu Liu; Vehicular Technology Conference, 1999. VTC 1999—Fall. IEEE VTS 50th vol. 3; Digital Object Identifier: 10.1109/VETECF.1999.801590 Publication Year: 1999 , pp. 1695-1699 vol. 3.*

(Continued)

*Primary Examiner* — Xavier Szewai Wong
(74) *Attorney, Agent, or Firm* — Finnegan, Henderson, Farabow, Garrett & Dunner, L.L.P.

(57) ABSTRACT

A data communication system includes a data transmitting apparatus and a data receiving apparatus. The data transmitting apparatus includes a packetizing section that generates data packets, an encoding section that performs redundant encoding on the data packets in predetermined time units and generates encoded blocks, a data transmitting section that transmits each encoded block to the data receiving apparatus, a data-size acquiring section that acquires a data size of transmission data in each predetermined time unit, and a packet-size determining section that, on the basis of the acquired data size, in each predetermined time unit, determines a packet size of each data packet. The data receiving apparatus includes a data receiving section that acquires data packets of the transmission data by receiving each encoded block transmitted, and a depacketizing section that analyzes the data packets of the acquired transmission data and reconfigures the transmission data.

9 Claims, 13 Drawing Sheets

OTHER PUBLICATIONS

Otsuka, et al., Development and evaluation of MPEG2 over IP system using FEC, The Information Processing Society of Japan memoir, Nov. 30, 2001, vol. 2001, No. 119, p. 43-48.*

J. Rosenberg, et al., "An RTP Payload Format for Generic Forward Error Correction, Request for Comments: 2733", [online], Dec. 1999, IETF Networking Wokring Group, [Search or Dec. 18, 2006], Internet <URL:http://www.ietf.org.rfc/rfc2733.txt>.

Official Communication from Japanese Patent Office, dated Nov. 17, 2008, issued in counterpart JP Application No. 2006-346959 (2 pages).

Tamaki Otsuka, et al., Development and evaluation of MPEG2 over IP system using FEC, The Information Processing Society of Japan memoir, Nov. 30, 2001, vol. 2001, No. 119, p. 43-48, Abstract.

* cited by examiner

DATA COMMUNICATION SYSTEM, DATA TRANSMITTING APPARATUS, DATA TRANSMITTING METHOD, AND METHOD FOR DETERMINING PACKET SIZE AND REDUNDANCY

CROSS REFERENCES TO RELATED APPLICATIONS

The present invention contains subject matter related to Japanese Patent Application JP 2006-346959 filed in the Japanese Patent Office on Dec. 25, 2006, the entire contents of which are incorporated herein by reference.

BACKGROUND OF THE INVENTION

1. Field of the Invention

The present invention relates to a data communication system, a data transmitting apparatus, a data transmitting method, and a method for determining a packet size and redundancy. In particular, the present invention relates to a data communication system in which, when transmission data is packetized and processed by redundant encoding in predetermined time units, and the resultant data is transmitted from a data transmitting apparatus to a data receiving apparatus, by determining a packet size on the basis of a data size of the transmission data in each predetermined time unit, sufficient tolerance for burst loss can be obtained even at a low data rate without increasing a delay.

2. Description of the Related Art

Recently, in data transmission on the Internet, in addition to services based on a downloading transmission system that has been used, services based on a streaming transmission system have increased. By way of example, in multimedia transmission with video files and audio files, in the downloading transmission system, a data file is temporarily downloaded from a distribution server to a receiving terminal, and the downloaded data file is subsequently played back. Thus, the downloading transmission system is unable to play back the data file until transfer of the data file completely finishes. Accordingly, the downloading transmission system is unsuitable to long-duration playback, realtime playback, etc. In the streaming transmission system, received data can be played back while data is being transferred from a transmitting end to a receiving terminal. Accordingly, the streaming transmission system is used in Internet services such as Internet telephone, remote video conferencing, and video-on-demand.

Internet technologies adapted for the streaming transmission system include the RTP (Realtime Transport Protocol) defined in IETF (Internet Engineering Task Force) RFC (Request For Comments) 3550. In data transmission based on the RTP, by adding a time stamp to each packet, and grasping a temporal relationship between a transmitting end and a receiving end on the basis of the time stamp, data can be played back without being affected by delay fluctuation (jitter) in packet transfer, with synchronization established.

Here, the RTP does not guarantee data transfer in realtime. Since priority, setting, and management of packet delivery are not covered by a transport service provided by the RTP, there is a possibility that RTP packets may have delivery delay and a packet loss similarly to other types of packets. Even if such a situation occurs, the receiving end can play back data by using only packets arriving within an expected time. This is because, even if video or audio data has some data loss, the data can be played back to some extent.

A packet whose delivery is delayed and a packet in which an error has occurred are directly discarded by the receiving end. In other words, there is a problem in that, if high quality data is delivered, the data may not be sufficiently played back due to a packet loss and error. In particular, since it is said that a wired interval has $10^{-5}$ or more errors and a wireless interval has $10^{-3}$ or more errors, from a viewpoint of retaining the quality of distribution media, direct use of the RTP leads to low reliability.

Accordingly, there is a method for issuing a retransmission request and transmitting retransmission packets in accordance with the TCP (Transmission Control Protocol) having high reliability in data transfer. However, since the TCP has a low throughput and a large delay although it is resistant to error, there is a possibility that, even if packets are retransmitted, the packets may be received late for a playback time.

As a technique for improving data transmission reliability by using the RTP, there is the so-called "FEC (Forward Error Correction) method" (see J. Rosenberg, et al., "An RTP Payload Format for Generic Forward Error Correction", Request for Comments:2733, [online], December 1999, IETF Network Working Group, [Searched on Dec. 18, 2006], Internet <URL:http://www.ietf.org/rfc/rfc2733.txt>). In the FEC method, redundant encoding is performed by using an error correcting code such as an RS (Reed-Solomon) code, with a plurality of packets used as an FEC block. For example, when an (n, k)RS code is used, (n−k) redundant packets can be generated, where k represents the number of original data packets, and n>k. In this case, when a transmitting apparatus transmits a total of n packets, and a receiving apparatus receives k packets among the n packets, RS decoding can restore k original data packets.

SUMMARY OF THE INVENTION

In multimedia data transmission of the related art, data is transmitted in a form packetized into a predetermined size on the basis of an MTU (maximum transmission unit). Accordingly, there are the following problems.

In the case of packetizing data into a predetermined size and using the FEC method to perform redundant encoding on the packetized data, in order to obtain sufficient tolerance for burst loss, it is necessary to increase the number of original data packets included in an FEC encoding unit, that is, a so-called "FEC block", or it is necessary to increase the proportion of redundant packets in the FEC block. Normally, to reduce overheads of redundant packets, the number of original data packets in the FEC block is increased. To increase the number of original data packets included in the FEC block for transmission data (encoded data) having a low data rate, it is necessary to form an FEC block by using original data packets over a plurality of time stamps, thus leading to an increase in delay.

For example, in the case of transmitting video data, although one time stamp is normally added to each video frame, two consecutive video frames can be encoded as an FEC block. In this case, even if a packet in a preceding frame in the FEC block has a loss, a receiving terminal is unable to perform decoding until all the packets in the FEC block have arrived. Thus, it is necessary to await the start of the decoding until packets in the next frame have arrived. This causes an increase in delay.

It is desirable to obtain sufficient tolerance for burst loss even at a low data rate without increasing a delay.

According to an embodiment of the present invention, there is provided a data communication system, for transmitting transmission data in a packetized form through a network, including a data transmitting apparatus and a data receiving apparatus. The data transmitting apparatus includes a packetizing section that generates data packets by packetizing the transmission data, an encoding section that performs redundant encoding on the data packets generated by the packetizing section in predetermined time units and generates encoded blocks, a data transmitting section that transmits each of the encoded blocks generated by the encoding section to the data receiving apparatus, a data-size acquiring section that acquires a data size of the transmission data in each of the predetermined time units, and a packet-size determining section that, on the basis of the data size acquired by the data-size acquiring section, in each of the predetermined time units, determines a packet size of each of the data packets generated by the packetizing section. The data receiving apparatus includes a data receiving section that acquires data packets of the transmission data by receiving each of the encoded blocks transmitted from the data transmitting apparatus, and a depacketizing section that analyzes the data packets of the transmission data acquired by the data receiving section and reconfigures the transmission data.

In the embodiment of the present invention, the data transmitting apparatus packetizes transmission data such as image data and audio data. After the data transmitting apparatus performs redundant encoding on the resultant packets in predetermined time units, for example, for each frame, the data transmitting apparatus transmits the packets to the data receiving apparatus through the network. The data receiving apparatus analyzes the received packets and reconfigures the transmission data.

In the data transmitting apparatus, a data size of the transmission data is acquired in each predetermined time unit, and, on the basis of the data size, a packet size of each data packet of the transmission data is determined. In this case, when the transmission data has a low data rate, by reducing the packet size, an FEC block having a sufficient number of packets can be formed on the basis of the transmission data in each predetermined time unit. The data receiving apparatus can perform decoding in the predetermined time units, whereby tolerance for burst loss can be obtained without increasing a delay.

In the embodiment of the present invention, for example, the data size of the transmission data may be acquired from a transmission rate determined on the basis of information representing a status of the network. For example, when the transmission data is video data, a data size of one frame is acquired by dividing a transmission rate by the number of frames per second. In this case, an encoder for obtaining the transmission data (encoded data) is controlled so that a rate of data output from the encoder is the transmission rate.

In the embodiment of the present invention, for example, the number of original data packets and the number of redundant packets in an encoded block may be determined so as to satisfy the expression $$P_t \geq 1 - \sum_{j=0}^{n-k} {}_nC_j p^j (1-p)^{n-j} \quad (n > k)$$

where p represents a packet loss ratio in the data receiving apparatus, k represents the number of data packets, n−k represents the number of redundant packets, and $P_t$ represents a target encoded block loss rate. In this case, the encoded block loss rate can be set to be equal to or less than the target encoded block loss rate $P_t$. In this case, the packet size may be determined by dividing the data size acquired in each predetermined time unit by the number of data packets determined by the expression.

Although there are combinations of the number k of original data packets and the number n−k of redundant packets which satisfy the expression, for example, a combination in which the total of the proportion of overheads of the original data packets and the proportion of overheads of the redundant packets is minimized is selected. In this case, the overheads can be minimized. For example, in image transmission, a high quality image can be transmitted and the amount of use of a network band can be minimized.

In the embodiment of the present invention, when the data size acquired in each predetermined time unit is greater than a threshold value, the packet size may be determined as a maximum transmission unit size, and the number of original data packets may be determined by dividing the data size acquired in the predetermined time unit by the maximum transmission unit size. In addition, in this embodiment, when the data size acquired in the predetermined time unit is not greater than the threshold value, the number of original data packets may be determined as a value at which the proportion of overheads of the redundant packets reaches no more than a predetermined value, and the packet size may be determined by dividing the data size acquired in the predetermined time unit by the number of original data packets.

When the packet size and the number of original data packets are determined by using the threshold value to perform case classification, the number of redundant packets is determined so as to satisfy the expression. Since, in this case, the number of original data packets is determined, the number of redundant packets is uniquely determined. Inconvenience of selecting one combination from a plurality of combinations of the number of data packets and the number of redundant packets is eliminated.

According to the embodiment of the present invention, in a case in which, after transmission data is packetized and the resultant data packets are redundant-encoded in predetermined time units, the encoded packets are transmitted from a data transmitting apparatus to a data receiving apparatus, a packet size is determined on the basis of a data size of the transmission data in each predetermined time unit. Therefore, sufficient tolerance for burst loss can be obtained even at a low data rate without increasing a delay.

DESCRIPTION OF THE PREFERRED EMBODIMENTS

Figure 1:
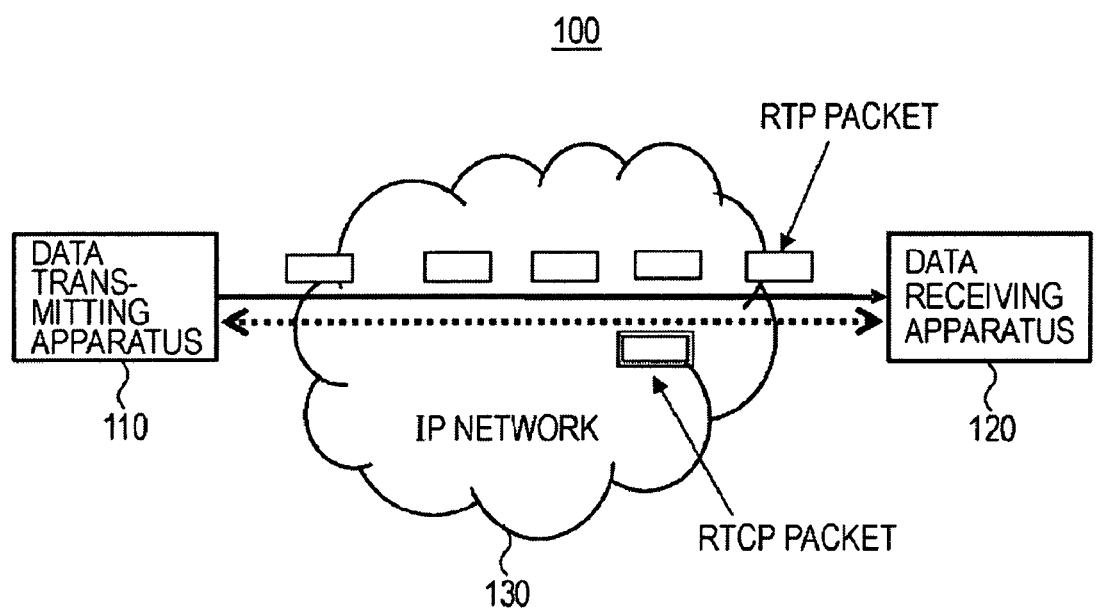
FIG. 1 is a block diagram showing the configuration of a data communication system according to an embodiment of the present invention.

An embodiment of the present invention is described below with reference to the accompanying drawings. FIG. 1 shows an example of the configuration of a data communication system 100 according to the embodiment of the present invention. The data communication system 100 includes a data transmitting apparatus 110 and a data receiving apparatus 120. The data transmitting apparatus 110 and the data receiving apparatus 120 are connected by a network (IP network) 130.

The data transmitting apparatus 110 packetizes transmission data such as video data or audio data, performs FEC encoding, as redundant encoding, on the packetized data in predetermined time units, and transmits the resultant data to the data receiving apparatus 120. When a received FEC block includes an original data packet including a loss, the data receiving apparatus 120 restores the original data packet by performing FEC decoding.

Figure 2:
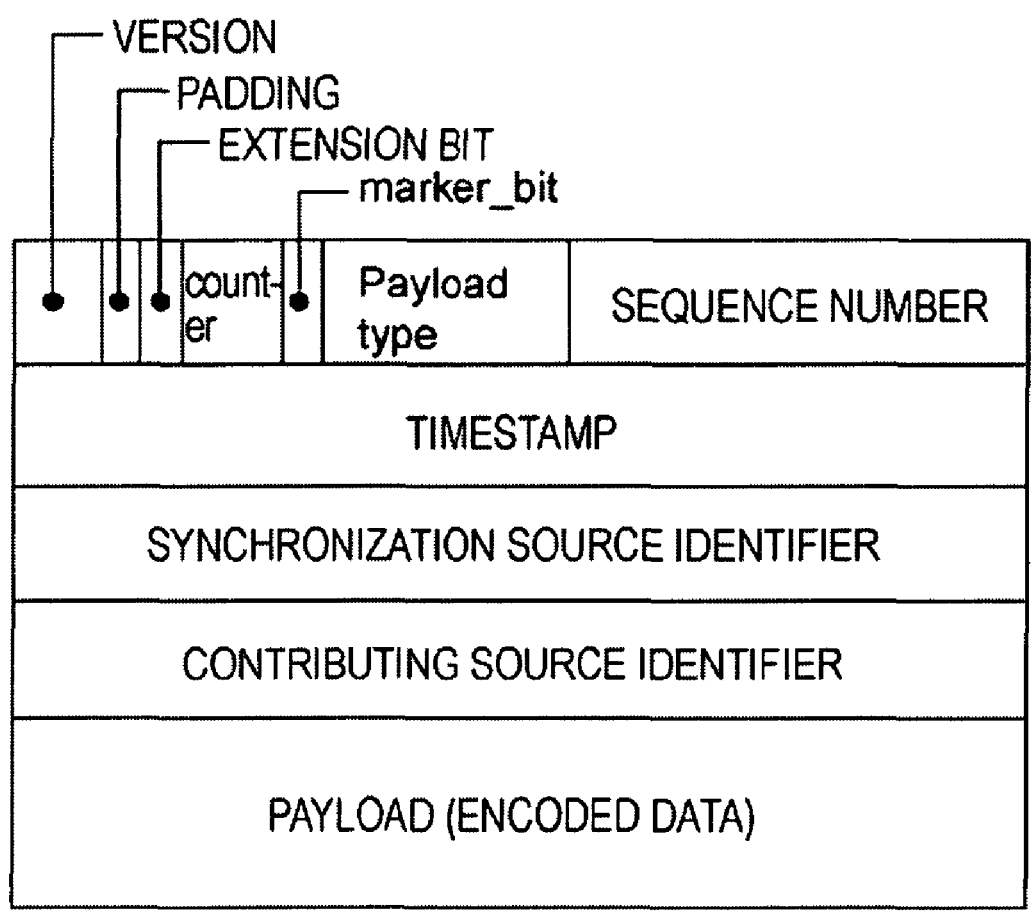
FIG. 2 is an illustration showing the format of an RTP packet.

FIG. 2 shows the configuration of an RTP packet. An RTP header includes, as fields, a version number (v), padding (P), an extension bit indicating whether there is an extension header, the number of transmission sources (indicated by "counter"), marker information (marker bit), a payload type, a sequence number, a time stamp, a synchronization source (transmission source) identifier (SSRC), and a contributing source (transmission source) identifier (CSRC).

On a data receiving side, when an RTP packet is used, control of a processing time is executed on the basis of a time stamp given to an RTP header, whereby a realtime image or audio playback control is made possible. For example, regarding RTP packets including encoded data of video data, a common time stamp is set in a plurality of RTP packets belonging to a video frame. In a terminating packet included in each frame, an identification flag representing termination is stored in an RTP header.

Figure 3:
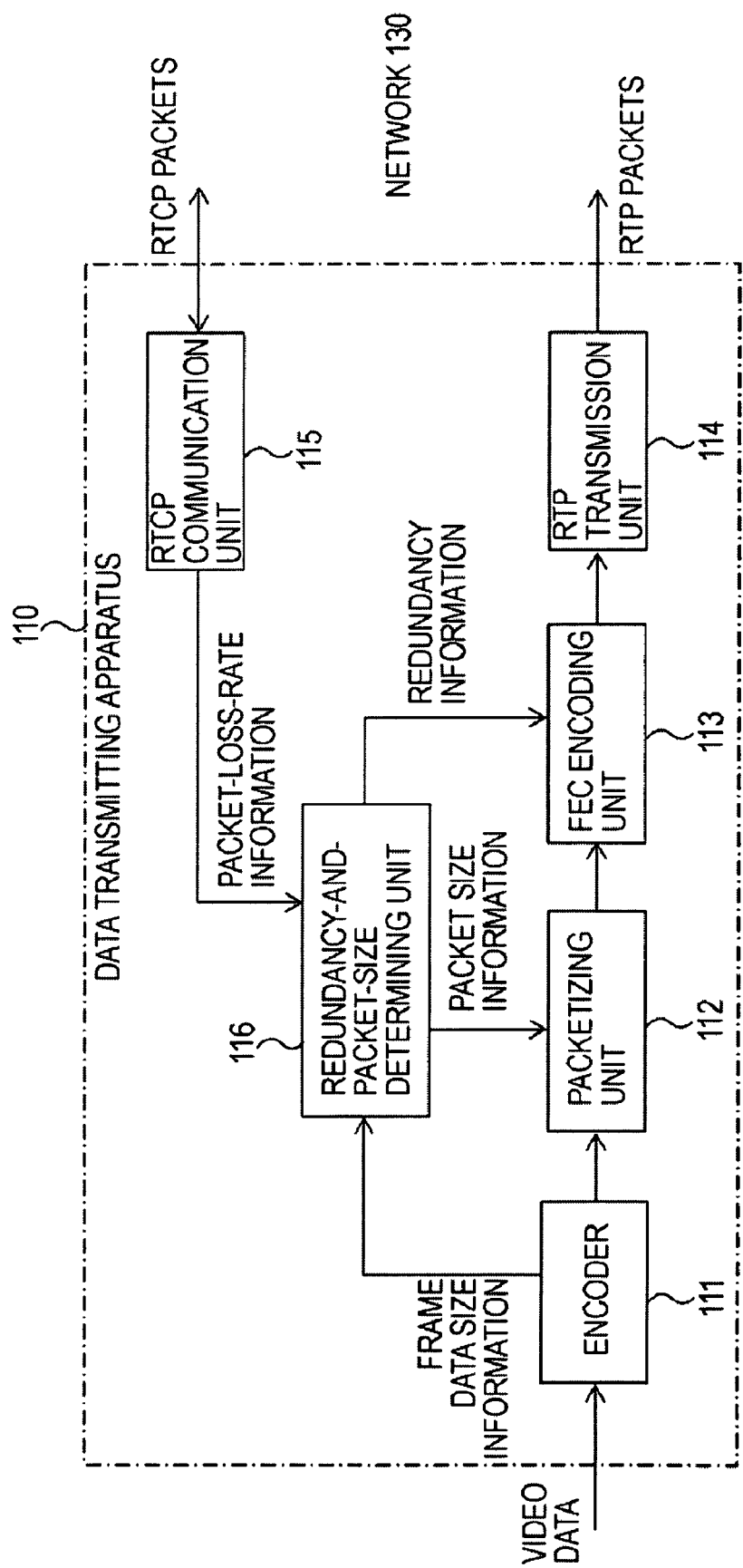
FIG. 3 is a block diagram showing an example of the configuration of a data transmitting apparatus.

FIG. 3 shows an example of the configuration of the data transmitting apparatus 110. The data transmitting apparatus 110 includes an encoder 111, a packetizing unit 112, an FEC encoding unit 113, an RTP transmission unit 114, an RTCP communication unit 115, and a redundancy-and-packet-size determining unit 116. Data transmitted from the data transmitting apparatus 110 to the data receiving apparatus 120 includes video data and audio data. However, in the following, a configuration for transmitting video data is mainly described.

The encoder 111 performs compression, such as MPEG-2 (Moving Picture Experts Group-2), MPEG-4, or JPEG-2000 (Joint Photographic Experts Group-2000), on video data as transmission data. The packetizing unit 112 generates data packets by packetizing encoded data generated by the encoder 111. The packetizing unit 112 generates data packets in accordance with the RTP. The RTP is defined in IETF RFC 1889. The packetizing unit 112 executes processing for generating packets each having the encoded data as a payload. By adding an RTP packet header to the payload data, a packet is generated.

In data transfer in accordance with the RTP, as shown in FIG. 2, a time stamp is added as time information to the packet. By referring to the time stamp, a temporal relationship between transmitting and receiving sides is grasped, and the receiving side can perform playback with synchronization established, without being affected by delay fluctuation (jitter) in packet transfer.

The FEC encoding unit 113 performs FEC redundant encoding on the packets generated by the packetizing unit 112 in predetermined time units. In this case, by using, as one FEC-block original data packet, a plurality of packets in the predetermined time units, the FEC encoding unit 113 uses an erasure error correcting code, such as a Read-Solomon code, to perform redundant encoding. In the case of using, for example, an (n, K)RS code, the FEC encoding unit 113 generates (n–k) redundant packets from k original data packets in a state before redundant encoding, where n>k.

In this case, for one FEC block, the data transmitting apparatus 110 transmits n packets. If the data receiving apparatus 120 receives K packets among the n packets, the data receiving apparatus 120 can restore k original data packets by performing RS decoding.

Here, as a predetermined time unit, one frame, a plurality of frames, or 1/integer of one frame can be selected. This embodiment is described, with the predetermined time unit as one frame. As described above, in a plurality of RTP packets belonging to one video frame, a common time stamp is set.

Figure 4:
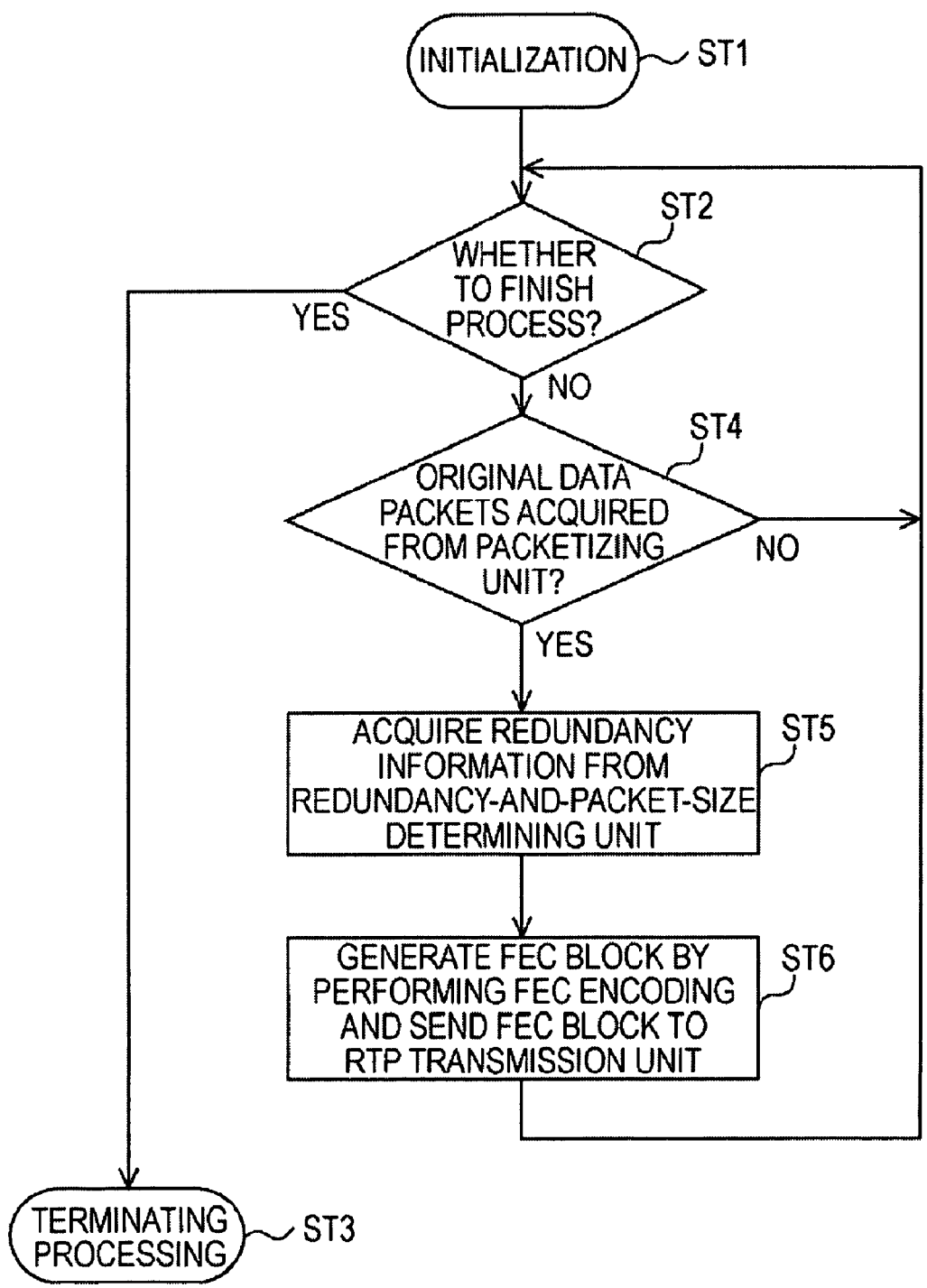
FIG. 4 is a flowchart showing an example of an FEC encoding process of the data transmitting apparatus.

FIG. 4 shows an example of an FEC encoding process of the FEC encoding unit 113. When, for example, transmission of video data is directed by a user (a user operation unit not shown), in step ST1, the FEC encoding unit 113 performs initialization to start the encoding process. In step ST2, the FEC encoding unit 113 determines whether to finish the encoding process. When transmission termination of video data is directed by the user, the FEC encoding unit 113 determines to finish the encoding process.

When finishing the encoding process, in step ST3, the FEC encoding unit 113 performs terminating processing. If the FEC encoding unit 113 has determined not to finish the encoding process, the FEC encoding unit 113 proceeds to step ST4. In step ST4, the FEC encoding unit 113 determines whether it has acquired packets from the packetizing unit 112. The packets supplied from the packetizing unit 112 serves as original data packets included in an FEC block.

If the FEC encoding unit 113 has not acquired the original data packets from the packetizing unit 112, the FEC encoding unit 113 returns to step ST2. If the FEC encoding unit 113 has acquired the original data packets from the packetizing unit 112, the FEC encoding unit 113 proceeds to step ST5. In step ST5, the FEC encoding unit 113 acquires redundancy information (the number of original data packets and the number of redundant packets in the FEC block) from the redundancy-and-packet-size determining unit 116. A method for determining redundancy and a packet size by the redundancy-and-packet-size determining unit 116 is described later.

In step ST6, the FEC encoding unit 113 generates an FEC block by performing FEC encoding, and sends the FEC block to the RTP transmission unit 114. After that, the FEC encoding unit 113 returns to step ST2. In this case, the FEC encoding unit 113 generates the FEC block by generating and adding redundant packets as many as the number of redundant packets obtained in step ST5 to original data packets as many as the number of original data packets obtained in step ST5.

Figure 5:
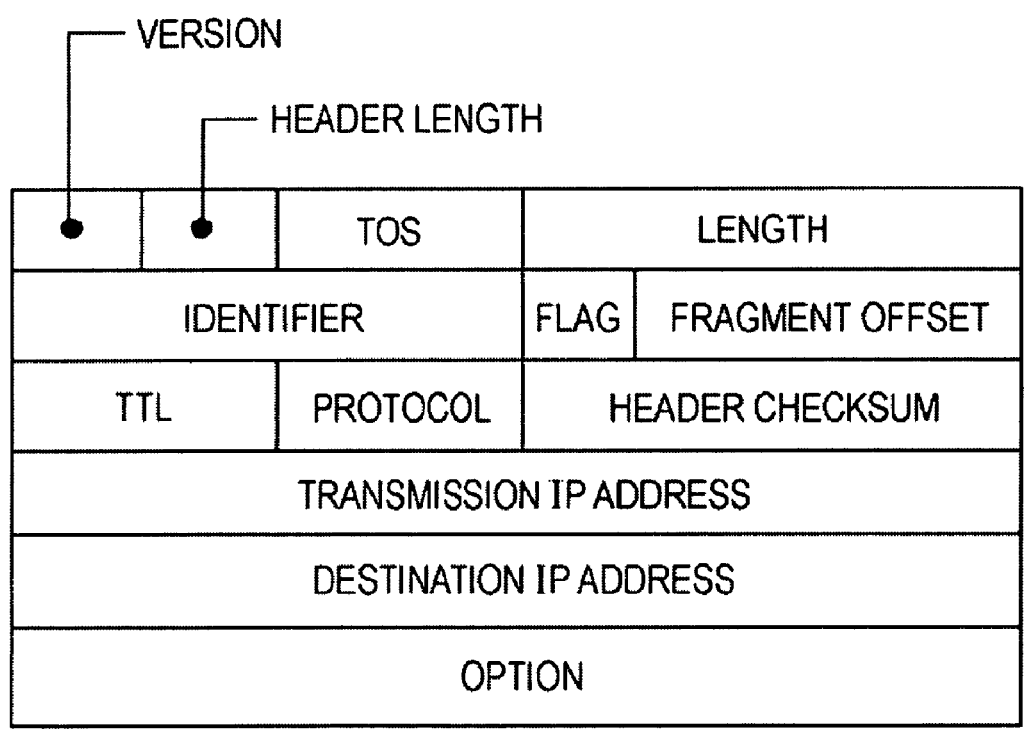
FIG. 5 is an illustration showing the format of an IP header.

The RTP transmission unit 114 adds an IP header to each packet included in each encoded block generated in the FEC encoding unit 113, and subsequently transmits the resultant packet to the network 130. FIG. 5 shows an IP header format. The IP header includes a version representing IPv4, IPv6, or the like, a header length, a TOS (Type of Service) field storing priority information, a packet length, a packet identifier, a flag as control information concerning data fragment in an IP layer, a fragment offset representing a location of fragmented data, a TTL (Time to Live) representing information of time up to data destruction, a protocol (4:IP, TCP:7, UDP:17 . . . ) used in an upper layer, a header checksum, a transmission source IP address, and a destination IP address.

Figure 6:
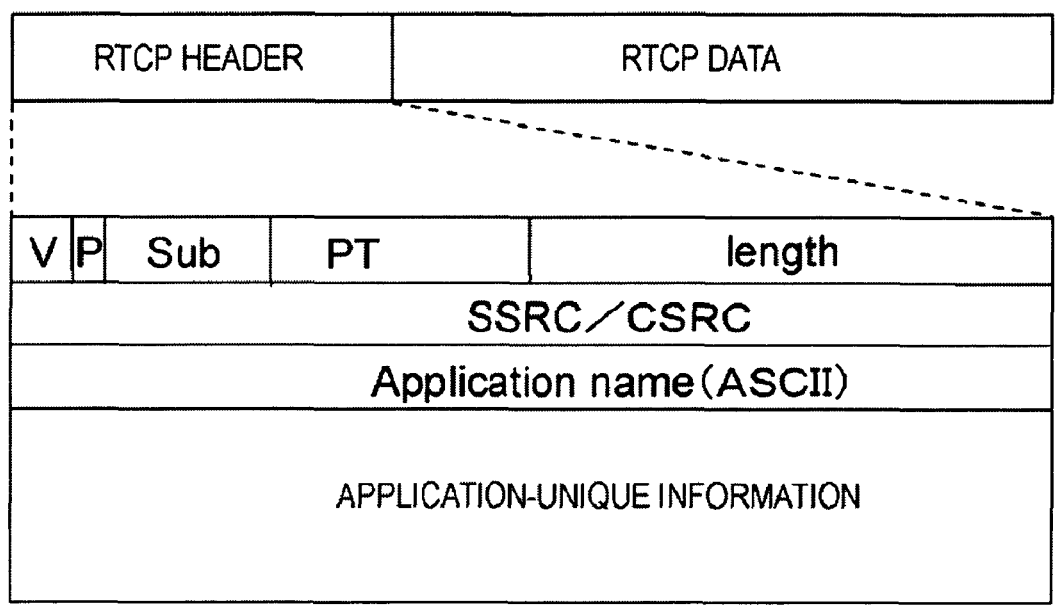
FIG. 6 is an illustration showing the format of an RTCP packet.

The RTCP communication unit 115 communicates with the data receiving apparatus 120 with RTCP (real-time transport control protocol) packets. The RTCP is defined in the IETF RFC 1889. FIG. 6 shows an RTCP packet format. An RTCP packet includes an RTCP header and RTCP data. The RTCP header includes version information (V), padding (P), a subtype, a packet type, length information, an SSRC/CSRC identifier, and a name described in ASCII (American Standard Code for Information Interchange). The RTCP header further includes application-unique information.

In this embodiment, the RTCP communication unit 115 receives, from the data receiving apparatus 120, as an RTCP packet, an RTCP packet including at least a packet loss ratio. As described later, the packet loss ratio is used in a determining process of the redundancy-and-packet-size determining unit 116.

The redundancy-and-packet-size determining unit 116 determines a packet size of each data packet generated by the packetizing unit 112, and determines the number of original data packets and the number of redundant packets in the FEC block generated by the FEC encoding unit 113. Here, the number of original data packets and the number of redundant packets form the redundancy information. The RTCP communication unit 115 determines redundancy and packet size for each frame of video data.

In addition to the packet loss information from the RTCP communication unit 115, data size (frame-data size) information of encoded data is supplied for each frame of video data from the encoder 111 to the redundancy-and-packet-size determining unit 116. The encoder 111 forms a data-size acquiring section.

From the packet loss ratio, the redundancy-and-packet-size determining unit 116 calculates redundancy and packet size necessary for satisfying a target block loss rate obtained after FEC decoding. For example, when the packet loss ratio is represented by p, the number of original packets is represented by k, the number of redundant packets is n−k, and a target encoded block loss rate is represented by $P_t$, the number k of original packets and the number n−k of redundant packets are determined so as to satisfy the following expression (1). In this case, the encoded block loss rate can be set to be equal to or less than the target encoded block loss rate $P_t$.

$$P_t \geq 1 - \sum_{j=0}^{n-k} {}_nC_j p^j (1-p)^{n-j} \quad (n > k) \quad (1)$$

When the original data size (frame data size) represented by the data size information supplied from the encoder 111 is represented by $S_o$, the redundancy-and-packet-size determining unit 116 calculates a packet size $S_p$ for each frame by using expression (2). In other words, the packet size $S_p$ is obtained by dividing the original data size $S_o$ by the number k of original data packets.

$$S_p = \frac{S_o}{k} \quad (2)$$

It is possible that there are combinations of the number k of original data packets and the number n−k of redundant packets which satisfy expression (1). By decreasing the number k of original data packets, the number n−k of redundant packets needs to be increased, so that overheads of the redundant packets increase. Conversely, by increasing the number k of original data packets, the packet size $S_p$ decreases, so that the proportion of overheads such as the packet header increases.

When the proportion of a packet header overhead in the FEC block is represented by $O_p$, the proportion of a redundant packet overhead is $O_r$, an overhead total is represented by $O_t$, and a header size for each packet is represented by $S_h$, the following expressions (3), (4), and (5) hold.

$$O_t = O_p + O_r \quad (3)$$

$$O_p = \frac{kS_h}{nS_p} = \frac{k^2 S_h}{nS_o} \quad (4)$$

$$O_r = \frac{(n-k)S_p}{nS_p} = \frac{n-k}{n} \quad (5)$$

The redundancy-and-packet-size determining unit 116 sets the number k of original data packets and the number n−k of redundant data packets so that expression (1) is satisfied and the overhead total $O_t$ is minimized. In this case, the overheads can be minimized. For example, in image transmission, a high quality image can be transmitted and the amount of use of a network band can be minimized.

The redundancy-and-packet-size determining unit 116 reports the packet size information to the packetizing unit 112. The packetizing unit 112 performs packetization on the basis of the reported packet size information. In addition, the redundancy-and-packet-size determining unit 116 reports information of the redundancy (the number of original data packets and the number of redundant packets) to the FEC encoding unit 113. The FEC encoding unit 113 performs FEC redundant encoding on the basis of the reported redundancy information.

The packet size information and redundancy information in each encoded block for each frame are sent to the data receiving apparatus 120 in a form included in an RTP packet header. The sent information is used in FEC decoding and re-configuration of transmission data.

Figure 7:
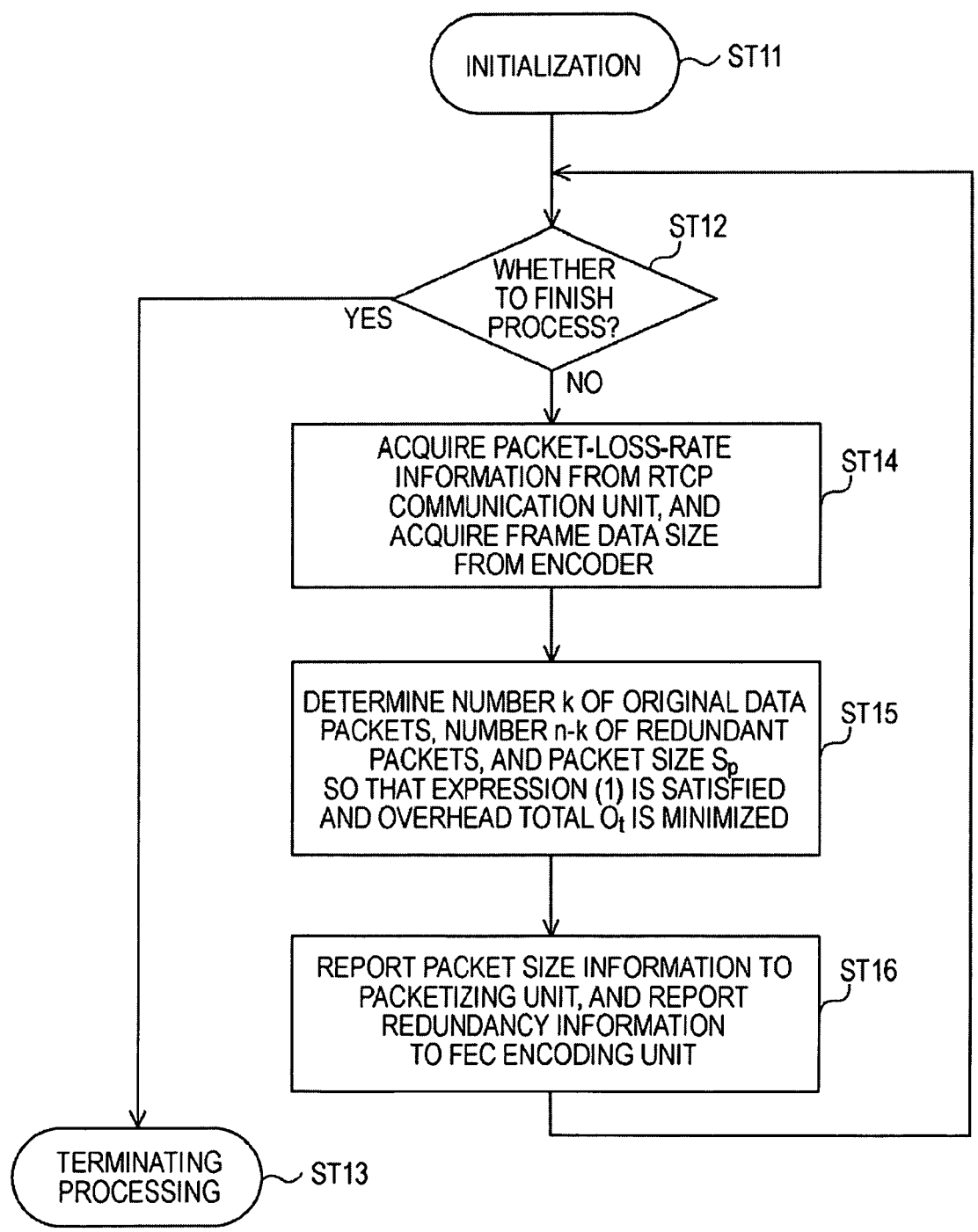
FIG. 7 is a flowchart showing an example of a redundancy-and-packet-size determining process of the data transmitting apparatus.

FIG. 7 shows an example of a redundancy-and-packet-size determining process of the redundancy-and-packet-size determining unit 116. For example, when transmission initiation of video data is directed by the user, in step ST11, the redundancy-and-packet-size determining unit 116 performs initialization and starts the redundancy-and-packet-size determining process. In step ST12, the redundancy-and-packet-size determining unit 116 determines whether to finish the redundancy-and-packet-size determining process. For example, when transmission termination of video data is directed by the user, the redundancy-and-packet-size determining unit 116 determines to finish the redundancy-and-packet-size determining process.

When the redundancy-and-packet-size determining process is finished, in step ST13, the redundancy-and-packet-size determining unit 116 performs terminating processing. If the redundancy-and-packet-size determining unit 116 has determined not to finish the redundancy-and-packet-size determining process, the redundancy-and-packet-size determining unit 116 proceeds to step ST14. In step ST14, the redundancy-and-packet-size determining unit 116 acquires packet-loss-rate information from the RTCP communication unit 115, and acquires a frame data size (the original data size $S_o$) from the encoder 111.

In step ST15, the redundancy-and-packet-size determining unit 116 determines the number k of original data packets, the number n−k of redundant packets, and the packet size $S_p$ so that expression (1) is satisfied and the overhead total $O_r$ is minimized. In step ST16, the redundancy-and-packet-size determining unit 116 reports information of the packet size $S_p$ determined in step ST15 to the packetizing unit 112, and reports information of the number k of original data packets and the number n−k of redundant packets determined in step ST15 to the FEC encoding unit 113. After that, returning to step ST12, the redundancy-and-packet-size determining unit 116 performs the redundancy-and-packet-size determining process for the next frame.

Figure 8:
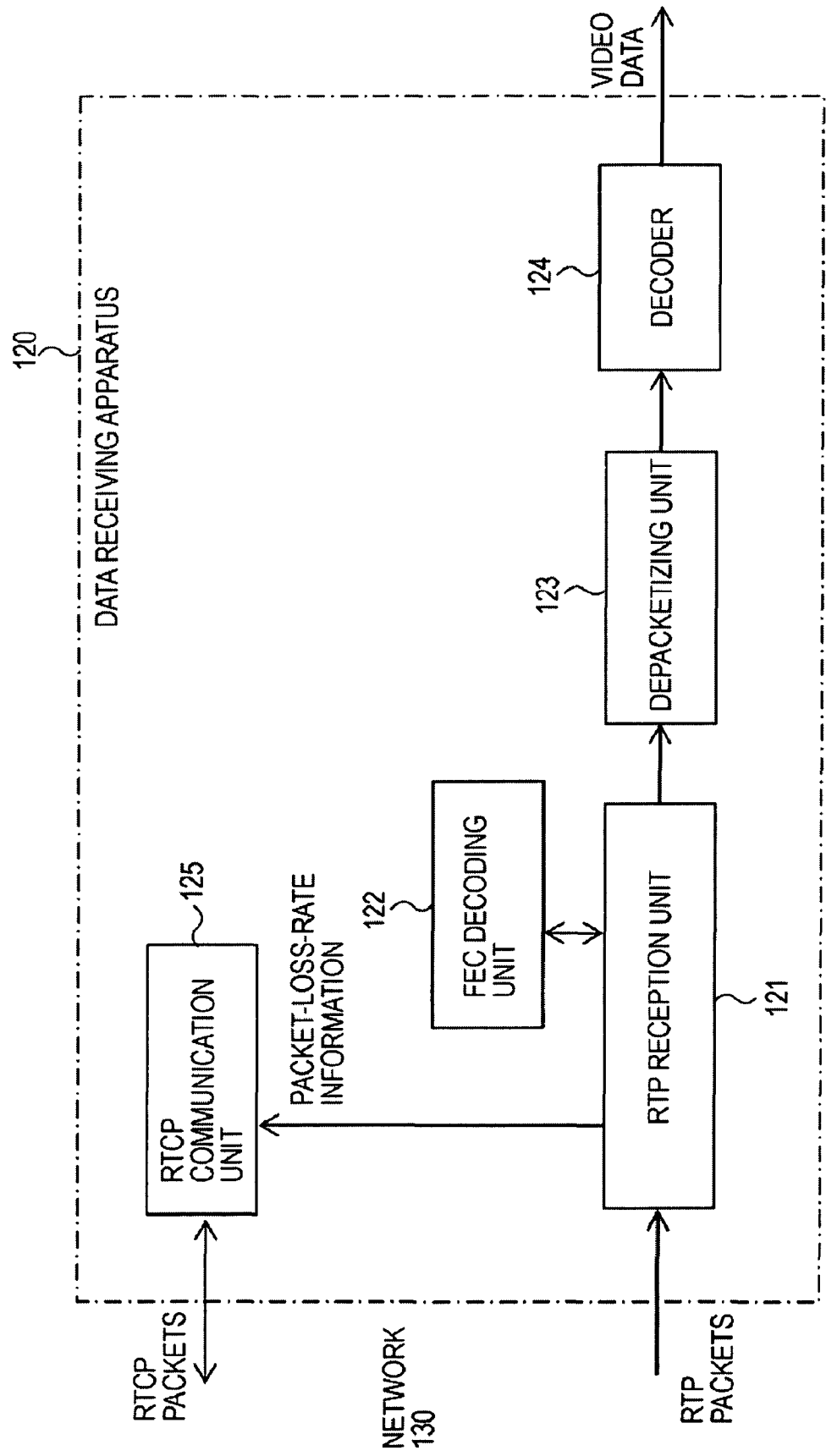
FIG. 8 is a block diagram showing an example of the configuration of a data receiving apparatus.

FIG. 8 shows the configuration of the data receiving apparatus 120. The data receiving apparatus 120 includes an RTP reception unit 121, an FEC decoding unit 122, a depacketizing unit 123, a decoder 124, and an RTCP communication unit 125.

The RTP reception unit 121 receives packets of each FEC block sent from the data transmitting apparatus 110 through the network 130, and temporarily stores the received packets in a built-in receiving buffer. In this case, the RTP reception unit 121 records whether the packets included in the FEC block have been received.

For example, recording is performed in the following example. In this example, FEC block blk_id 1 included five packets, and, among the packets, only the fourth packet was not received.

```
fec_blk_db_t {
  unsigned int blk_id;   //
    intpkt_db[BLK_PKT_MAX];//1:received,0:not receiver
  pkt_num;              //the number of packet in fec block
} fec_blk_db;
fec_blk_db.blk_id=1;
fec_blk_db.pkt_num=5;
fec_blk_db.pkt_db[0]=1;
fec_blk_db.pkt_db[1]=1;
fec_blk_db.pkt_db[2]=1;
fec_blk_db.pkt_db[3]=0;
fec_blk_db.pkt_db[4]=1;
```

In a case in which, among the packets of each FEC block stored in the receiving buffer of the RTP reception unit 121, original data packets include a loss, when decoding is possible, FEC decoding is performed to restore the packets including the loss. For example, when an (n, K)RS code is used, if k packets among N packets included in an FEC block are received, k original data packets can be restored by RS decoding. The RTP reception unit 121 and the FEC decoding unit 122 form a data receiving section.

Figure 9:
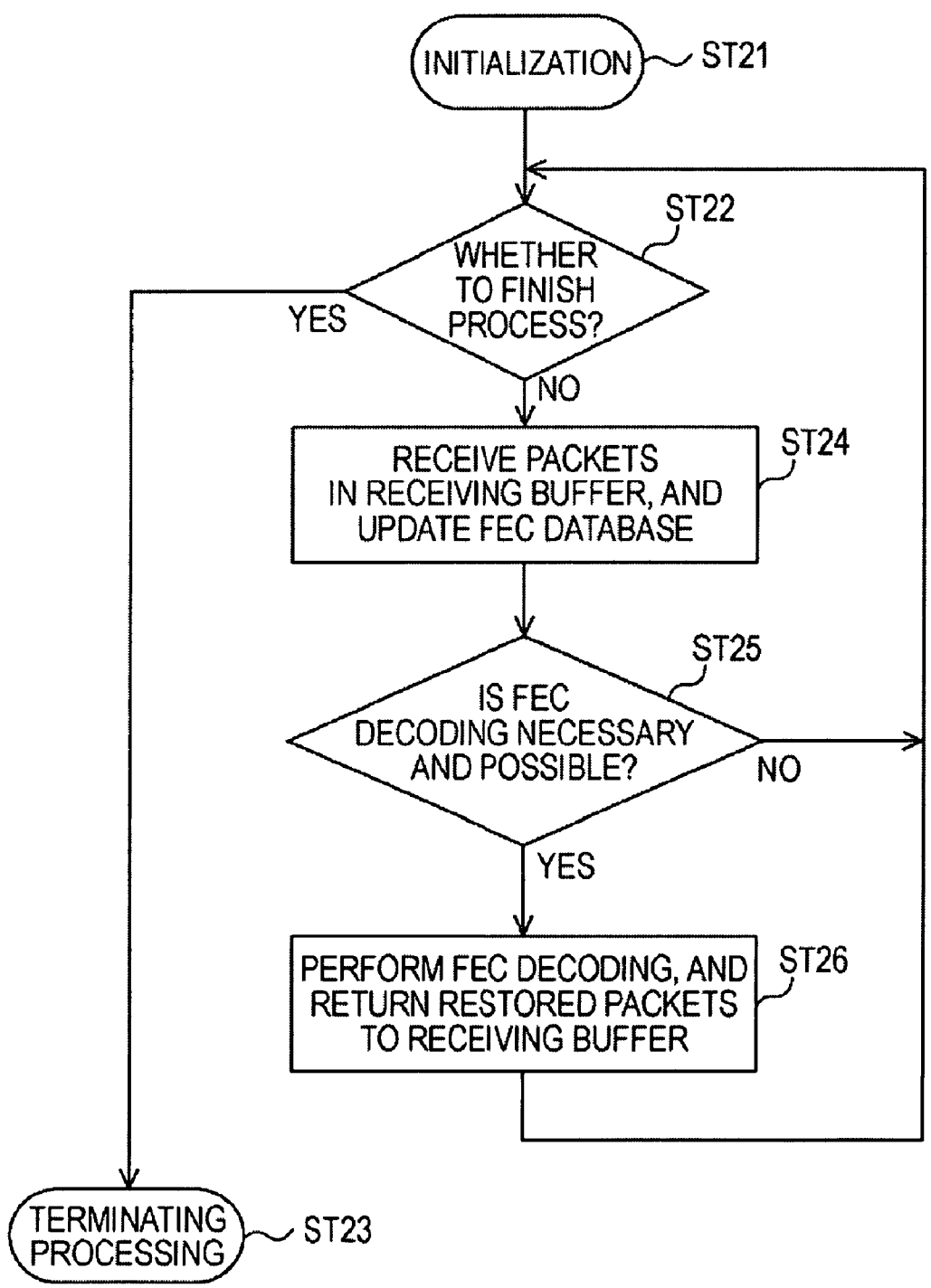
FIG. 9 is a flowchart showing an example of a packet-receiving-and-FEC-decoding process of the data receiving apparatus.

FIG. 9 shows an example of a packet-receiving-and-FEC-decoding process. For example, when reception initiation of video data is directed by the user (the user operation unit not shown), in step ST21, the RTP reception unit 121 initializes the RTP reception unit 121 and the FEC decoding unit 122, and starts the packet-receiving-and-FEC-decoding process. In step ST22, the RTP reception unit 121 determines whether to finish the packet-receiving-and-FEC-decoding process. The RTP reception unit 121 determines to finish the packet-receiving-and-FEC-decoding process, for example, when reception termination of video data is directed by the user.

When the RTP reception unit 121 finishes the packet-receiving-and-FEC-decoding process, in step ST23, the RTP reception unit 121 performs terminating processing. If the RTP reception unit 121 has determined not to finish the packet-receiving-and-FEC-decoding process, the RTP reception unit 121 proceeds to step ST24. In step ST24, the RTP reception unit 121 receives packets in a receiving buffer and updates an FEC database. Updating of the FEC database corresponds to recording of whether packets included in each FEC block have been received, as described above.

In step ST25, the RTP reception unit 121 determines whether or not FEC decoding is necessary and FEC decoding is possible. When the original data packets of an FEC block include a loss, the RTP reception unit 121 determines that FEC decoding is necessary. In addition, in a case in which, among a plurality of packets included in the FEC block, packets as many as the number of packets that can be decoded are received, the RTP reception unit 121 determines that decoding is possible.

If FEC decoding is not necessary, or if FEC decoding is difficult although the FEC decoding is necessary, the RTP reception unit 121 returns to step ST22. In this case, the original data packets of the FEC block which include the loss are not restored, and the original data packets remain including the loss.

If FEC decoding is necessary and FEC decoding is possible, in step ST26, the RTP reception unit 121 returns the restored packets to the receiving buffer by using the FEC decoding unit 122 to perform decoding. After step ST26, the RTP reception unit 121 returns to step ST22, and performs the packet-receiving-and-FEC-decoding process for the next FEC block.

The depacketizing unit 123 analyzes the RTP packets stored in the receiving buffer of the RTP reception unit 121. The depacketizing unit 123 reconfigures encoded data in a state prior to packetization by executing analyses on a header and payload in the RTP packet. The decoder 124 obtains video data by performing decoding on the encoded data reconfigured by the depacketizing unit 123.

The RTCP communication unit 125 communicates with the data transmitting apparatus 110 with RTCP packets. In this embodiment, the RTCP communication unit 125 transmits, as RTCP packets, to the data transmitting apparatus 110, RTCP packets including packet-loss-rate information. In this case, the packet-loss-rate information is supplied from the RTP reception unit 121.

An operation of the data communication system 100 shown in FIG. 1 is described below.

Video data to be transmitted is supplied from a data source (not shown) to the encoder 111 in the data transmitting apparatus 110 (see FIG. 3). The encoder 111 generates encoded data by performing compression encoding, such as MPEG, on the video data. The encoded data generated by the encoder 111 is supplied to the packetizing unit 112.

Information of a frame data size (original data size $S_o$) is supplied from the encoder 111 to the redundancy-and-packet-size determining unit 116 for each frame of video data. Information of the packet loss ratio in the data receiving apparatus 120 is supplied from the RTCP communication unit 115 to the redundancy-and-packet-size determining unit 116.

On the basis of the information of the frame data size (the original data size $S_o$) and the packet loss ratio, the redundancy-and-packet-size determining unit 116 determines information of a packet size and information of redundancy (the number of original data packets and the number of redundant packets). The information of the packet size is reported to the packetizing unit 112. The information of redundancy is reported to the FEC encoding unit 113.

The packetizing unit 112 generates data packets (RTP packets) in accordance with the RTP by packetizing the encoded data. In this case, encoded data of each frame is packetized, with the encoded data divided for each packet size reported by the redundancy-and-packet-size determining unit 116. In each frame, the packetizing unit 112 generates packets (the original data packets) as many as the number of original data packets determined by the redundancy-and-packet-size determining unit 116.

The packets generated by the packetizing unit 112 are supplied to the FEC encoding unit 113. The FEC encoding unit 113 generates FEC blocks by performing redundant encoding for each frame on the basis of the redundancy information reported from the redundancy-and-packet-size determining unit 116. For example, when an (n, K)RS code is used, the FEC encoding unit 113 generates (n−k) redundant packets from k original data packets in a state prior to redundant encoding.

The packets of each EEC block generated by the FEC encoding unit 113 are supplied to the RTP transmission unit 114. Each packet is transmitted from the RTP transmission unit 114 to the data receiving apparatus 120 (see FIG. 8) through the network 130.

The RTP reception unit 121 in the data receiving apparatus 120 receives the packets transmitted from the data transmitting apparatus 110 through the network 130, and temporarily stores the received packets in the built-in receiving buffer. In a case in which, among the packets of each FEC block stored in the receiving buffer, the original data packets include a loss, when decoding is possible, the FEC decoding unit 122 restores the packets including the loss by performing FEC decoding.

The RTP packets stored in the receiving buffer of the RTP reception unit 121 are analyzed by the depacketizing unit 123. From the RTP packets, encoded data in a state prior to packetization is reconfigured. The reconfigured encoded data is supplied to the decoder 124. The decoder 124 obtains video data by performing decoding on the encoded data.

Information of a packet loss rate is supplied from the RTP reception unit 121 to the RTCP communication unit 125. The RTCP communication unit 125 generates RTCP packets including the information of the packet loss rate, and transmits the RTCP packets to the data transmitting apparatus 110 through the network 130. As described above, the packet loss rate information transmitted to the data transmitting apparatus 110 with the RTCP packets is used in the redundancy-and-packet-size determining unit 116 in the data transmitting apparatus 110.

According to the data communication system 100 in FIG. 1, the data transmitting apparatus 110 determines a packet size $S_p$ of each data packet for each frame on the basis of a frame data size (original data size $S_o$). In this case, when the encoded data (transmission data) generated by the encoder 111 has a low data rate, by reducing the packet size, FEC blocks having a sufficient number of packets can be formed only on the basis of encoded data (transmission data) for each frame. Therefore, the data receiving apparatus 120 can perform decoding for each frame. For example, in a case in which a time stamp is given for each frame, sufficient tolerance for burst loss can be obtained without increasing a delay.

In addition, according to the data communication system 100 in FIG. 1, the redundancy-and-packet-size determining unit 116 in the data transmitting apparatus 110 determines the redundancy (the number k of original packets and the number n−k of redundant packets) so as to satisfy expression (1), and an encoded block loss rate in the data receiving apparatus 120 can be set to be equal to or less than a target encoded block loss rate $P_t$.

According to the data communication system 100 in FIG. 1, the redundancy-and-packet-size determining unit 116 in the data transmitting apparatus 110 selects, from a plurality of combinations of the number k of original data packets and the number n−k of redundant packets which satisfy expression (1), a combination in which a total $O_t$ of an overhead proportion $O_p$ of the original data packets and an overhead proportion $O_r$ of the redundant packets is minimized, whereby the overheads can be minimized. Therefore, in image transmission, a high quality image can be transmitted and the amount of use of a network band can be minimized.

The redundancy-and-packet-size determining unit 116 may determine the redundancy (the number k of original data packets and the number n−k of redundant packets) by performing a process different from the above-described process (see the flowchart shown in FIG. 7).

For example, the redundancy-and-packet-size determining unit 116 determines the redundancy and the frame data size (the original data size $S_o$) in the following manner, depending on whether or not the frame data size is greater than a threshold value. Here, the threshold value can take an arbitrary value. One example of determining the threshold value is described below. Specifically, when the least n satisfying expression (1) is calculated, with $S_p$=MTU (maximum transmission unit), while gradually changing the original data size $S_o$ from 0, there is a point at which $O_r$>0.5 changes to $O_r$≦0.5. Thus, the original data size $S_o$ at this point is used as the threshold value.

First, a case in which the original data size $S_o$ is greater than the threshold value is described. In this case, the redundancy-and-packet-size determining unit 116 determines, as an MTU size, the packet size $S_p$ of each data packet generated by the packetizing unit 112. In addition, the redundancy-and-packet-size determining unit 116 determines the number k of original data packets in the FEC block generated in the FEC encoding unit 113 by dividing the original data size $S_o$ by the determined packet size (MTU size) $S_p$.

The redundancy-and-packet-size determining unit 116 determines the number n−k of redundant packets in the FEC block generated in the FEC encoding unit 113 so as to satisfy expression (1).

Next, a case in which the original data size $S_o$ is not greater than the threshold value is described. In this case, the redundancy-and-packet-size determining unit 116 determines, as a value (k_const) at which the redundant packet overhead proportion $O_r$ reaches no more than a predetermined value, the number k of original data packets in the FEC block generated in the FEC encoding unit 113.

In this case, when k=1, the least n satisfying expression (1) and $O_r$ at this time are found, when k=2, the least n satisfying expression (1) and $O_r$ at this time are found, and values when k=3 are found. In such a case, as k increases, $O_r$ decreases. The number k at which $O_r$ reaches no more than a predetermined value is determined as k_const.

In addition, the redundancy-and-packet-size determining unit 116 determines the number n−k of redundant packets in the FEC block generated in the FEC encoding unit 113 so as to satisfy expression (1). The redundancy-and-packet-size determining unit 116 also determines the packet size $S_p$ of each data packet generated in the packetizing unit 112 by dividing the original data size $S_o$ by the determined number k of original data packets.

Figure 10:
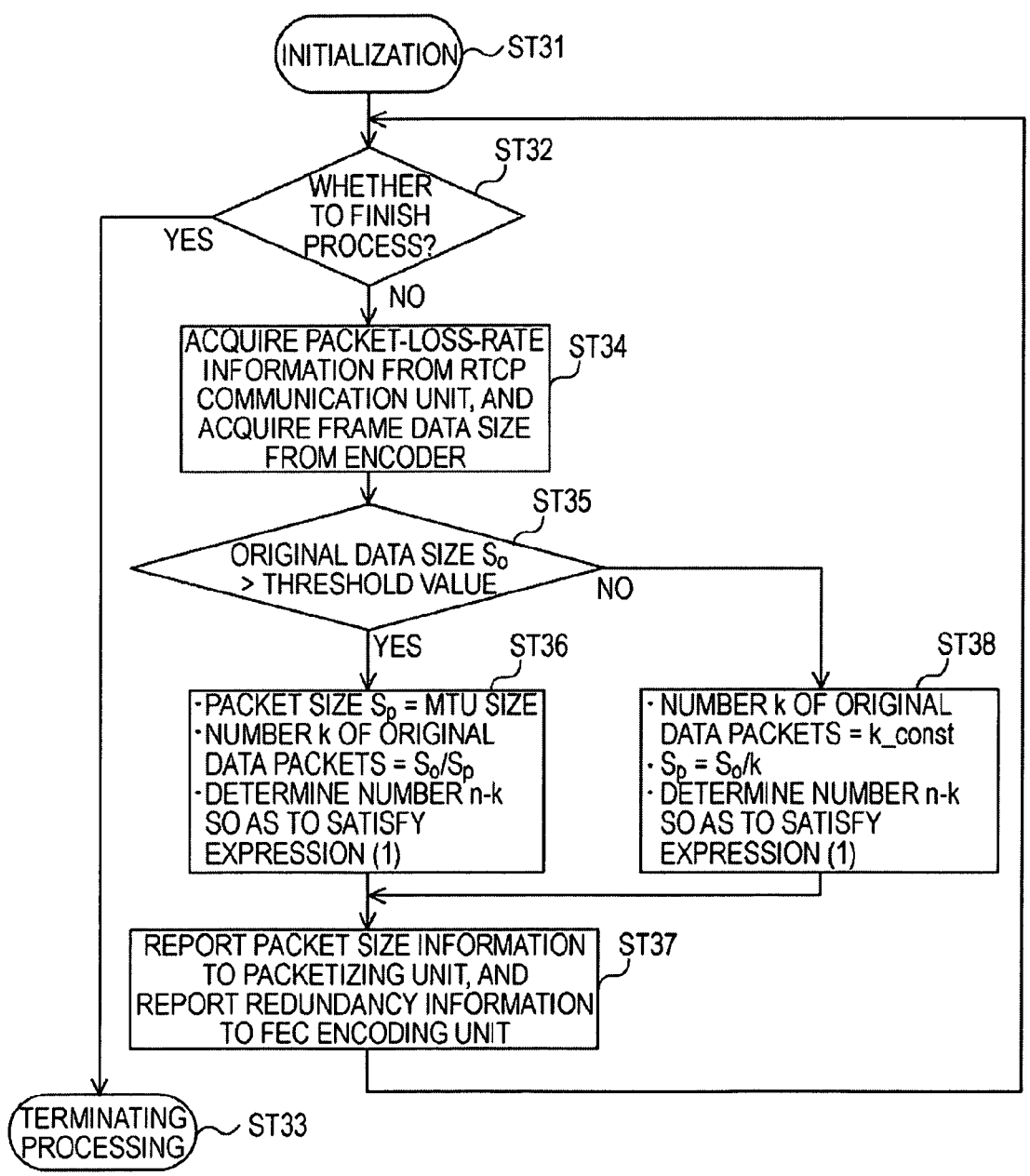
FIG. 10 is a flowchart showing another example of the redundancy-and-packet-size determining process of the data transmitting apparatus.

The flowchart shown in FIG. 10 shows an example of a redundancy-and-packet-size determining process of the redundancy-and-packet-size determining unit 116. For example, when transmission initiation of video data is directed by the user, in step ST31, the redundancy-and-packet-size determining unit 116 performs initialization and starts the redundancy-and-packet-size determining process. In step ST32, the redundancy-and-packet-size determining unit 116 determines whether to finish the redundancy-and-packet-size determining process. The redundancy-and-packet-size determining unit 116 determines to finish the redundancy-and-packet-size determining process, for example, when transmission termination of video data is directed by the user.

When the redundancy-and-packet-size determining unit 116 finishes the redundancy-and-packet-size determining process, in step ST33, the redundancy-and-packet-size determining unit 116 performs terminating processing. When the redundancy-and-packet-size determining unit 116 does not finish the redundancy-and-packet-size determining process, the redundancy-and-packet-size determining unit 116 proceeds to step ST34. In step ST34, the redundancy-and-packet-size determining unit 116 acquires the packet loss rate information from the RTCP communication unit 115, and acquires the frame data size (the original data size $S_o$) from the encoder 111.

In step ST35, the redundancy-and-packet-size determining unit 116 determines whether or not the original data size $S_o$ is greater than a threshold value. If the original data size $S_o$ is greater than the threshold value, the redundancy-and-packet-size determining unit 116 proceeds to step ST36. In step ST36, the redundancy-and-packet-size determining unit 116 determines, as an MTU size, the packet size $S_p$ of each data packet generated in the packetizing unit 112.

In addition, the redundancy-and-packet-size determining unit 116 determines the number k of original data packets in the FEC block generated in the FEC encoding unit 113 by dividing the original data size $S_o$ by the determined packet size (MTU size) $S_p$. In step ST36, the redundancy-and-packet-size determining unit 116 determines the number n−k of redundant packets in the FEC block generated in the FEC encoding unit 113 so as to satisfy expression (1).

After step ST36, the redundancy-and-packet-size determining unit 116 proceeds to step ST37. In step ST37, the redundancy-and-packet-size determining unit 116 reports the packet size information to the packetizing unit 112, and reports the redundancy information to the FEC encoding unit 113. After that, returning to step ST32, the redundancy-and-packet-size determining unit 116 performs the redundancy-and-packet-size determining process for the next frame.

If, in step ST35, the original data size $S_o$ is not greater than the threshold value, the redundancy-and-packet-size determining unit 116 proceeds to step ST38. In step ST38, the redundancy-and-packet-size determining unit 116 determines, as a value (k_const) at which the redundant packet overhead proportion $O_r$ reaches no more than a predetermined value, the number k of original data packets in the FEC block generated in the EEC encoding unit 113.

In addition, in step ST38, the redundancy-and-packet-size determining unit 116 determines the number n−k of redundant packets in the FEC block generated in the FEC encoding unit 113 so as to satisfy expression (1). In step ST38, the redundancy-and-packet-size determining unit 116 also determines the packet size $S_p$ of each data packet generated in the packetizing unit 112 by dividing the original data size $S_o$ by the determined number k of original data packets.

After step ST38, the redundancy-and-packet-size determining unit 116 proceeds to step ST37. In step ST37, the redundancy-and-packet-size determining unit 116 reports the packet size information to the packetizing unit 112, and reports the redundancy information to the FEC encoding unit 113. After that, returning to step ST32, the redundancy-and-packet-size determining unit 116 performs redundancy-and-packet-size determining process for the next frame.

As described above, when the redundancy (the number k of original data packets and the number n−k of redundant packets) and the packet size $S_p$ are determined by using the threshold value to perform case classification, the number k of original data packets has already been determined in a stage of using expression (1) to find the number n−k of redundant packets. Thus, the number n−k of redundant packets is uniquely determined. Therefore, inconvenience of selecting one combination from a plurality of combinations of the number k of original data packets and the number n−k of redundant packets which satisfy expression (1) is eliminated.

In addition, in the above-described embodiment, the redundancy-and-packet-size determining unit 116 in the data transmitting apparatus 110 uses the information of the frame data size (the original data size $S_o$) supplied for each frame from the encoder 111. However, it is possible that the redundancy-and-packet-size determining unit 116 acquires and uses the frame data size (the original data size $S_o$) on the basis of a transmission rate determined by a rate control unit.

Figure 11:
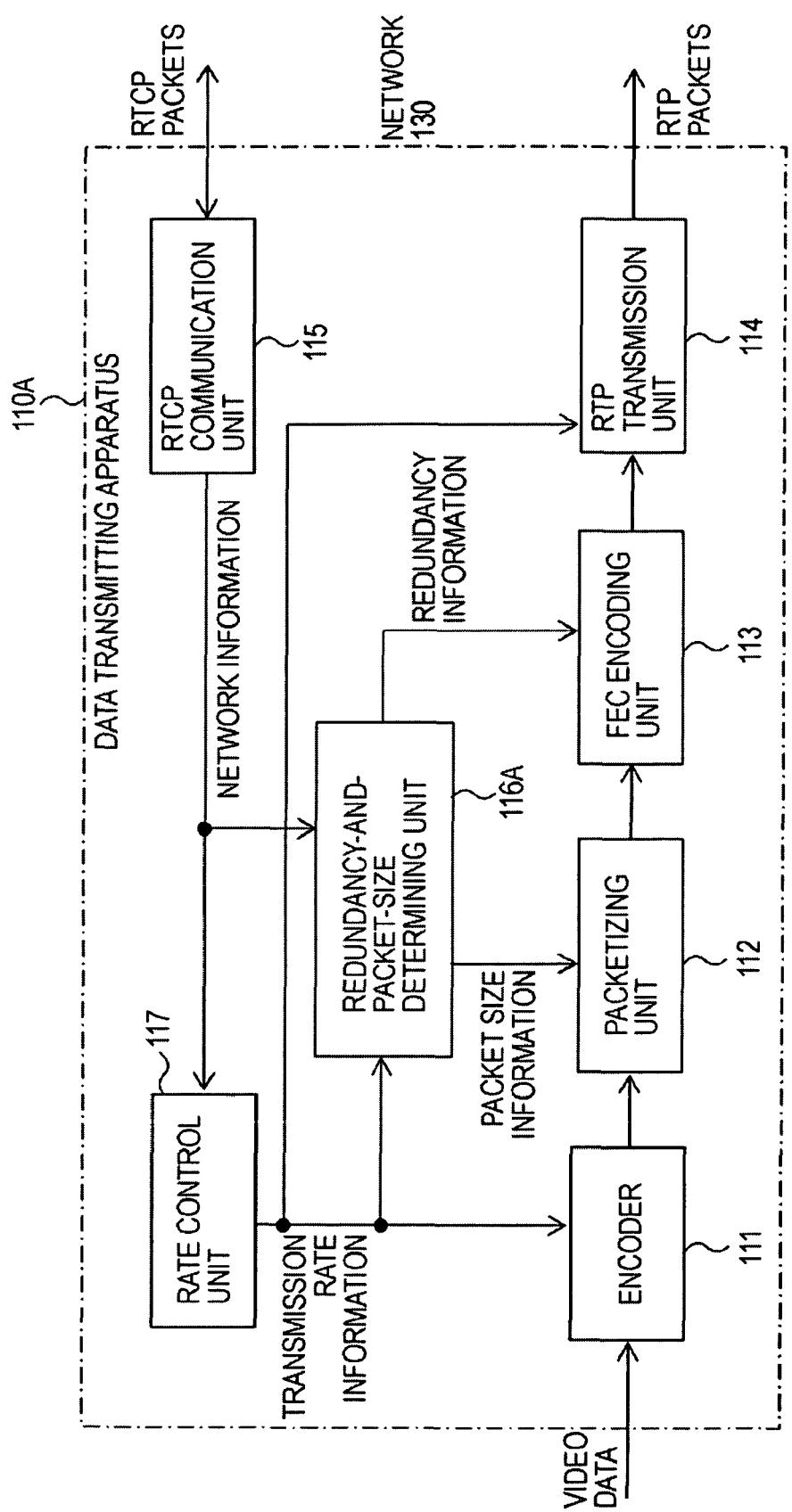
FIG. 11 is a block diagram showing another example of the configuration of the data transmitting apparatus.

FIG. 11 shows an example of the configuration of a data transmitting apparatus 110A including a rate control unit. In FIG. 11, portions corresponding to those shown in FIG. 3 are denoted by identical reference numerals. The data transmitting apparatus 110A includes an encoder 111, a packetizing unit 112, an FEC encoding unit 113, an RTP transmission unit 114, an RTCP communication unit 115, a redundancy-and-packet-size determining unit 116A, and a rate control unit 117.

The rate control unit 117 determines a transmission rate on the basis of network information, such as a packet loss rate and an RTT (round trip time), supplied from the RTCP communication unit 115. The RTCP communication unit 115 measures an RTT by exchanging delay-measuring RTCP packets with the data receiving apparatus 120. Information of the transmission rate determined by the rate control unit 117 is reported to the encoder 111 and the RTP transmission unit 114, and is reported to the redundancy-and-packet-size determining unit 116A.

The redundancy-and-packet-size determining unit 116A finds the frame data size (the original data size $S_o$) on the basis of the transmission rate information reported from the rate control unit 117. The redundancy-and-packet-size determining unit 116A finds the frame data size by dividing the transmission rate by a frame rate of video data which is determined beforehand in the system. In this sense, the redundancy-and-packet-size determining unit 116A forms a data-size acquiring section.

On the basis of the frame data size (the original data size $S_o$) and the packet loss rate supplied from the RTCP communication unit 115, the redundancy-and-packet-size determining unit 116A determines the redundancy (the number k of original data packets and the number n−k of redundant packets) and the packet size $S_p$. By using the frame data size (the original data size $S_o$) and the packet loss ratio, the redundancy-and-packet-size determining unit 116A performs a redundancy-and-packet-size determining process similarly to that performed by the redundancy-and-packet-size determining unit 116 in the data transmitting apparatus 110 shown in FIG. 3, although a detailed description thereof is omitted.

Other features and operation of the data transmitting apparatus 110A shown in FIG. 11 are similar to those of the data transmitting apparatus 110 shown in FIG. 3.

Figure 12:
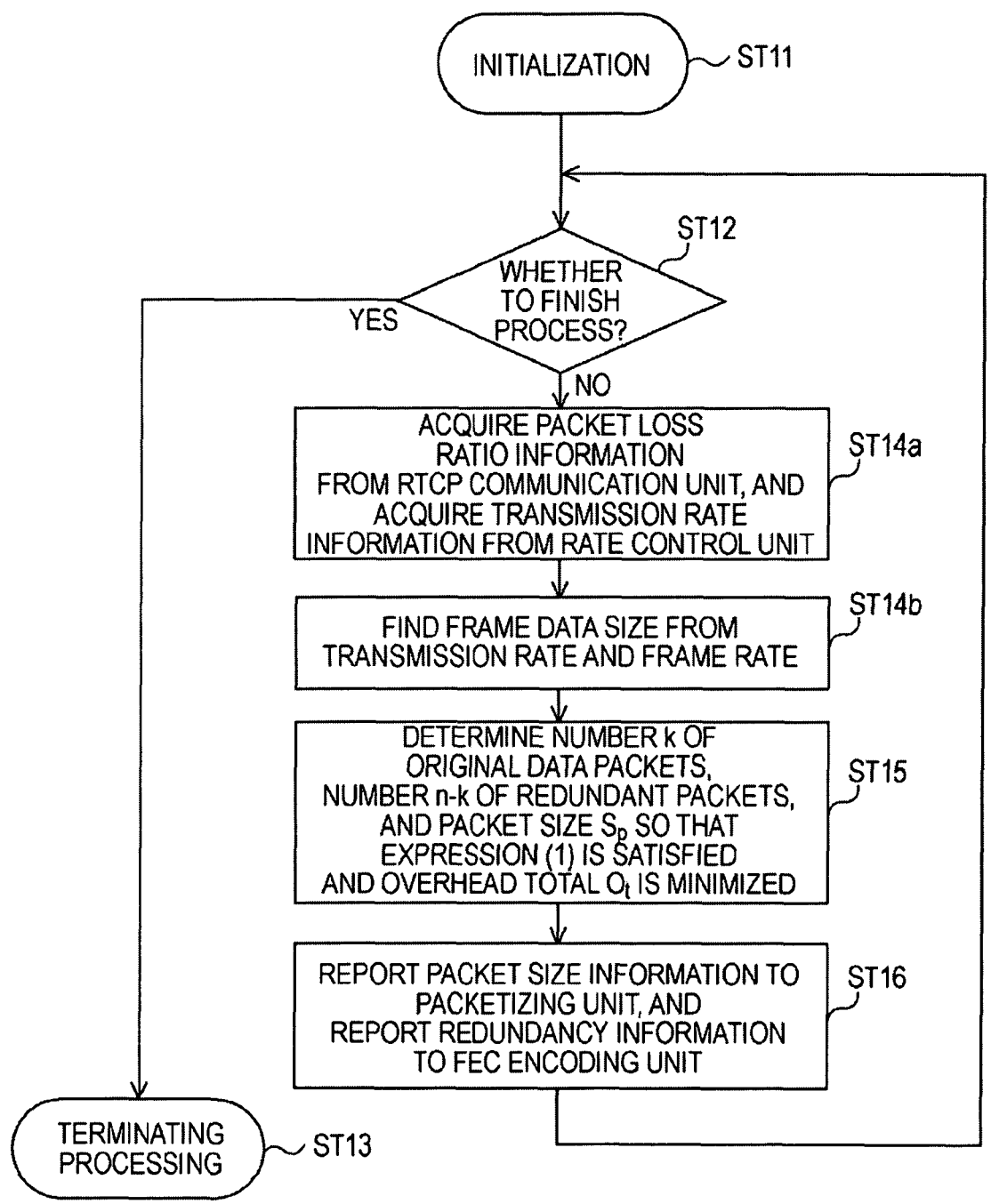
FIG. 12 is a flowchart showing another example of the redundancy-and-packet-size determining process of the data transmitting apparatus.

The flowchart shown in FIG. 12 shows an example of a redundancy-and-packet-size determining process of the redundancy-and-packet-size determining unit 116A. In FIG. 12, portions corresponding to those shown in FIG. 7 are denoted by identical reference numerals, and detailed descriptions thereof are omitted.

In the redundancy-and-packet-size determining process shown in FIG. 12, instead of step ST14 in the redundancy-and-packet-size determining process shown in FIG. 7, steps ST14a and ST14b are performed.

Specifically, if, in step ST12, the redundancy-and-packet-size determining unit 116A does not finish the redundancy-and-packet-size determining process, the redundancy-and-packet-size determining unit 116 proceeds to step ST14a. In step ST14a, the redundancy-and-packet-size determining unit 116A acquires the packet loss ratio information from the RTCP communication unit 115, and acquires the transmission rate information from the rate control unit 117. In step ST14b, the redundancy-and-packet-size determining unit 116A finds the frame data size (the original data size $S_o$) from the transmission rate and the frame rate.

After step ST14b, the redundancy-and-packet-size determining unit 116A proceeds to step ST15 for determining the redundancy (the number k of original data packets and the number n−k of redundant packets) and the packet size $S_p$. The subsequent step is similar to that in the flowchart shown in FIG. 7.

Figure 13:
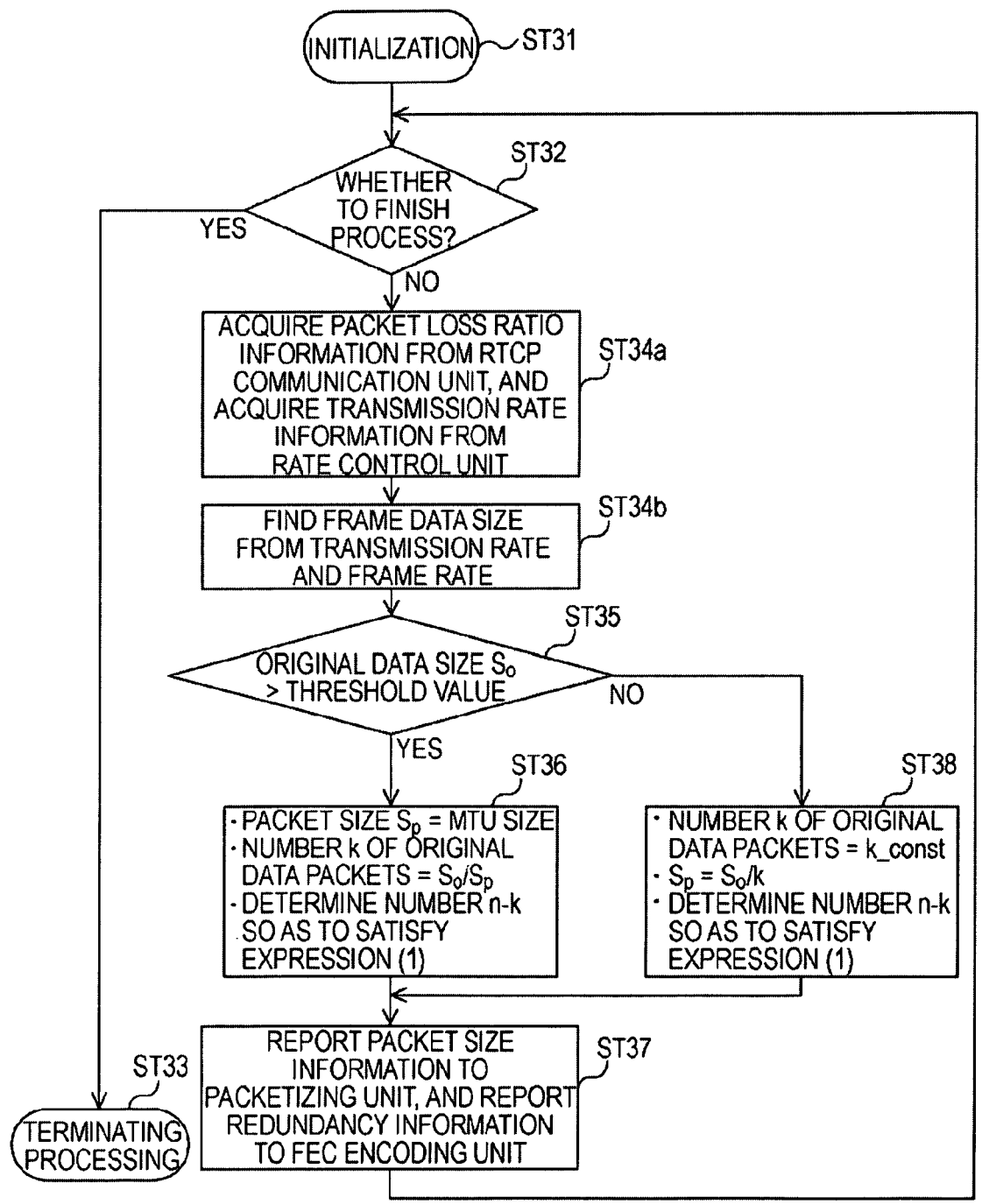
FIG. 13 is a flowchart showing a further example of the redundancy-and-packet-size determining process of the data transmitting apparatus.

The flowchart shown in FIG. 13 shows another example of the redundancy-and-packet-size determining process of the redundancy-and-packet-size determining unit 116A. In FIG. 13, steps corresponding to those shown in FIG. 10 are denoted by identical reference numerals, and detailed descriptions thereof are omitted.

In the redundancy-and-packet-size determining process shown in FIG. 13, instead of step ST34 in the redundancy-and-packet-size determining process shown in FIG. 10, steps ST34a and ST34b are performed.

Specifically, if, in step ST32, the redundancy-and-packet-size determining unit 116A does not finish the redundancy-and-packet-size determining process, the redundancy-and-packet-size determining unit 116A proceeds to step ST34a. In step ST34a, the redundancy-and-packet-size determining unit 116A acquires the packet loss ratio information from the RTCP communication unit 115, and acquires the transmission rate information from the rate control unit 117. In step ST34b, the redundancy-and-packet-size determining unit 116A finds the frame data size (the original data size $S_o$) from the transmission rate and the frame rate.

After step ST34b, the redundancy-and-packet-size determining unit 116A proceeds to step ST35 for comparing the original data size $S_o$ with the threshold value. The subsequent steps are similar to those in the flowchart shown in FIG. 10.

In a case in which the data receiving apparatus 120 is unable to restore original data packets including a loss in an FEC block by using the FEC decoding process, although the case is not described above, the data receiving apparatus 120 may issue a retransmission request by transmitting a NACK (Negative ACKnowledge)-RTCP packet to the data transmitting apparatus 110.

It should be understood by those skilled in the art that various modifications, combinations, sub-combinations and alterations may occur depending on design requirements and other factors insofar as they are within the scope of the appended claims or the equivalents thereof.

What is claimed is:

1. A data transmitting apparatus for transmitting transmission data in a packetized form to a data receiving apparatus through a network, the data transmitting apparatus comprising:

a packetizing section that generates data packets by packetizing the transmission data;

an encoding section that performs redundant encoding on the data packets generated by the packetizing section in predetermined time units and generates encoded blocks;

a data transmitting section that transmits each of the encoded blocks generated by the encoding section to the data receiving apparatus;

a data-size acquiring section that acquires a data size of the transmission data in each of the predetermined time units;

a packet-size determining section that, on the basis of the data size acquired by the data-size acquiring section, in each of the predetermined time units, determines a packet size of each of the data packets generated by the packetizing section; and a redundancy determining section that, on the basis of information of a packet loss rate in the data receiving apparatus, determines the number of original data packets and the number of redundant packets in each of the encoded blocks generated by the encoding section, wherein the redundancy determining section determines the number of original data packets and the number of redundant packets so as to satisfy the expression $$P_t \geq 1 - \sum_{j=0}^{n-k} {}_nC_j p^j (1-p)^{n-j} \quad (n > k)$$

where p represents the packet loss ratio, n represents the number of transmitted packets, k represents the number of original data packets, n−k represents the number of redundant packets, and $P_t$ represents a target encoded block loss rate, and wherein, from combinations of the number of original data packets and the number of redundant packets, which satisfy the expression, the redundancy determining section selects one of the combinations in which the total of the proportion of overheads of the original data packets and the proportion of overheads of the redundant packets is minimized.

2. The data transmitting apparatus according to claim 1, wherein the packet-size determining section determines the packet size by dividing the data size acquired by the data-size acquiring section by the number of original data packets determined by the redundancy determining section.

3. A data transmitting apparatus for transmitting transmission data in a packetized form to a data receiving apparatus through a network, the data transmitting apparatus comprising:

a packetizing section that generates data packets by packetizing the transmission data;

an encoding section that performs redundant encoding on the data packets generated by the packetizing section in predetermined time units and generates encoded blocks;

a data transmitting section that transmits each of the encoded blocks generated by the encoding section to the data receiving apparatus;

a data-size acquiring section that acquires a data size of the transmission data in each of the predetermined time units;

a packet-size determining section that, on the basis of the data size acquired by the data-size acquiring section, in each of the predetermined time units, determines a packet size of each of the data packets generated by the packetizing section; and a redundancy determining section that determines the number of original data packets and the number of redundant packets in each of the encoded blocks generated by the encoding section, wherein, when the data size acquired by the data-size acquiring section is greater than a threshold value, the packet-size determining section determines the packet size as a maximum transmission unit size, wherein the redundancy determining section determines the number of original data packets and the number of redundant packets so as to satisfy the expression $$P_t \geq 1 - \sum_{j=0}^{n-k} {}_nC_j p^j (1-p)^{n-j} \quad (n > k)$$

where p represents a packet loss ratio in the data receiving apparatus, n represents the number of transmitted packets, k represents the number of original data packets, n–k represents the number of redundant packets, and $P_t$ represents a target encoded block loss rate, and wherein, from combinations of the number of original data packets and the number of redundant packets, which satisfy the expression, the redundancy determining section selects one of the combinations in which the total of the proportion of overheads of the original data packets and the proportion of overheads of the redundant packets is minimized.

4. The data transmitting apparatus according to claim 3, wherein the redundancy determining section determines the number of original data packets by dividing the data size acquired by the data-size acquiring section by the packet size determined by the packet-size determining section.

5. A data transmitting apparatus for transmitting transmission data in a packetized form to a data receiving apparatus through a network, the data transmitting apparatus comprising:

a packetizing section that generates data packets by packetizing the transmission data;

an encoding section that performs redundant encoding on the data packets generated by the packetizing section in predetermined time units and generates encoded blocks;

a data transmitting section that transmits each of the encoded blocks generated by the encoding section to the data receiving apparatus;

a data-size acquiring section that acquires a data size of the transmission data in each of the predetermined time units;

a packet-size determining section that, on the basis of the data size acquired by the data-size acquiring section, in each of the predetermined time units, determines a packet size of each of the data packets generated by the packetizing section; and a redundancy determining section that determines the number of original data packets and the number of redundant packets in each of the encoded blocks generated by the encoding section, wherein:

the redundancy determining section determines the number of original data packets and the number of redundant packets so as to satisfy the expression $$P_t \geq 1 - \sum_{j=0}^{n-k} {}_nC_j p^j (1-p)^{n-j} \quad (n > k)$$

where p represents a packet loss ratio in the data receiving apparatus, n represents the number of transmitted packets, k represents the number of original data packets, n–k represents the number of redundant packets, and $P_t$ represents a target encoded block loss rate, and from combinations of the number of original data packets and the number of redundant packets, which satisfy the expression, the redundancy determining section selects one of the combinations in which the total of the proportion of overheads of the original data packets and the proportion of overheads of the redundant packets is minimized.

6. The data transmitting apparatus according to claim 5, when the data size acquired by the data-size acquiring section is equal to or less than a threshold value, the redundancy determining section determines the number of original data packets as a value at which the proportion of overheads of the redundant packets reaches no more than a predetermined value.

7. The data transmitting apparatus according to claim 5, wherein the packet-size determining section determines the packet size by dividing the data size acquired by the data-size acquiring section by the number of original data packets determined by the redundancy determining section.

8. A method for determining a packet size and redundancy in a data transmitting apparatus including a packetizing section that generates data packets by packetizing transmission data, an encoding section that performs redundant encoding on the data packets generated by the packetizing section in predetermined time units and generates encoded blocks, and a data transmitting section that transmits each of the encoded blocks generated by the encoding section to a data receiving apparatus, the method comprising the steps of:

determining the number of original data packets and the number of redundant packets in each of the encoded blocks generated by the encoding section so as to satisfy the expression $$P_t \geq 1 - \sum_{j=0}^{n-k} {}_nC_j p^j (1-p)^{n-j} \quad (n > k)$$

where p represents a packet loss ratio in the data receiving apparatus, n represents the number of transmitted packets, k represents the number of original data packets, n–k represents the number of redundant packets, and $P_t$ represents a target encoded block loss rate;

from combinations of the number of original data packets and the number of redundant packets, which satisfy the expression, the redundancy determining section selects one of the combinations in which the total of the proportion of overheads of the original data packets and the proportion of overheads of the redundant packets is minimized, and determining a packet size of each of the data packets generated by the packetizing section in each of the predetermined time units by dividing a data size of the transmission data by the determined number of original data packets.

9. A method for determining a packet size and redundancy in a data transmitting apparatus including a packetizing section that generates data packets by packetizing transmission data, an encoding section that performs redundant encoding on the data packets generated by the packetizing section in predetermined time units and generates encoded blocks, and a data transmitting section that transmits each of the encoded blocks generated by the encoding section to a data receiving apparatus, the method comprising the steps of:

when a data size of the transmission data which is acquired in each of the predetermined time units is greater than a threshold value, determining, as a maximum transmission unit size, a packet size of each of the data packets generated by the packetizing section;

determining the number of original data packets in each of the encoded blocks generated by the encoding section by dividing, by the determined packet size, the data size of the transmission data which is acquired in each of the predetermined time units; and determining the number of redundant packets in each of the encoded blocks generated by the encoding section so as to satisfy the expression $$P_t \geq 1 - \sum_{j=0}^{n-k} {}_nC_j p^j (1-p)^{n-j} \quad (n > k)$$

where p represents a packet loss ratio in the data receiving apparatus, n represents the number of transmitted packets, k represents the number of original data packets, n−k represents the number of redundant packets, and $P_t$ represents a target encoded block loss rate; and when the data size of the transmission data which is acquired in each of the predetermined time units is not greater than the threshold value, determining the number of original data packets and the number of redundant packets in each of the encoded blocks generated by the encoding section so as to satisfy the expression $$P_t \geq 1 - \sum_{j=0}^{n-k} {}_nC_j p^j (1-p)^{n-j} \quad (n > k)$$

where p represents the packet loss ratio in the data receiving apparatus, n represents the number of transmitted packets, k represents the number of original data packets, n−k represents the number of redundant packets, and $P_t$ represents a target encoded block loss rate;

from combinations of the number of original data packets and the number of redundant packets, which satisfy the expression, the redundancy determining section selects one of the combinations in which the total of the proportion of overheads of the original data packets and the proportion of overheads of the redundant packets is minimized, and determining a packet size of each of the data packets generated by the packetizing section by dividing a data size of the transmission data by the determined number of original data packets in each of the predetermined units.

* * * * *